June 28, 1966  J. D. MACKENZIE ETAL  3,258,434
SEMICONDUCTING GLASS
Filed Aug. 1, 1962
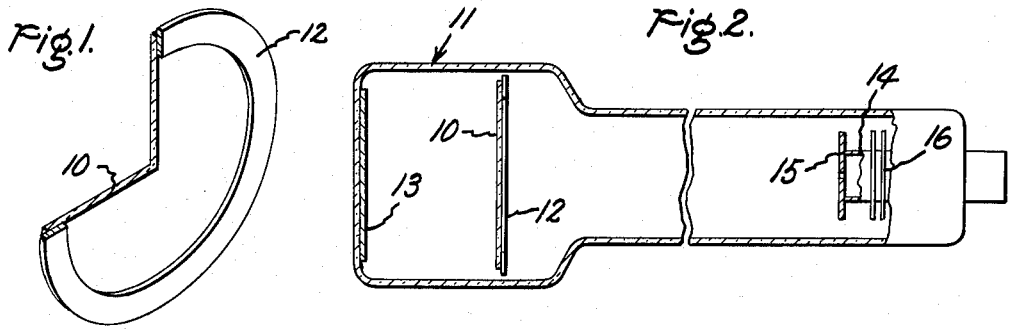
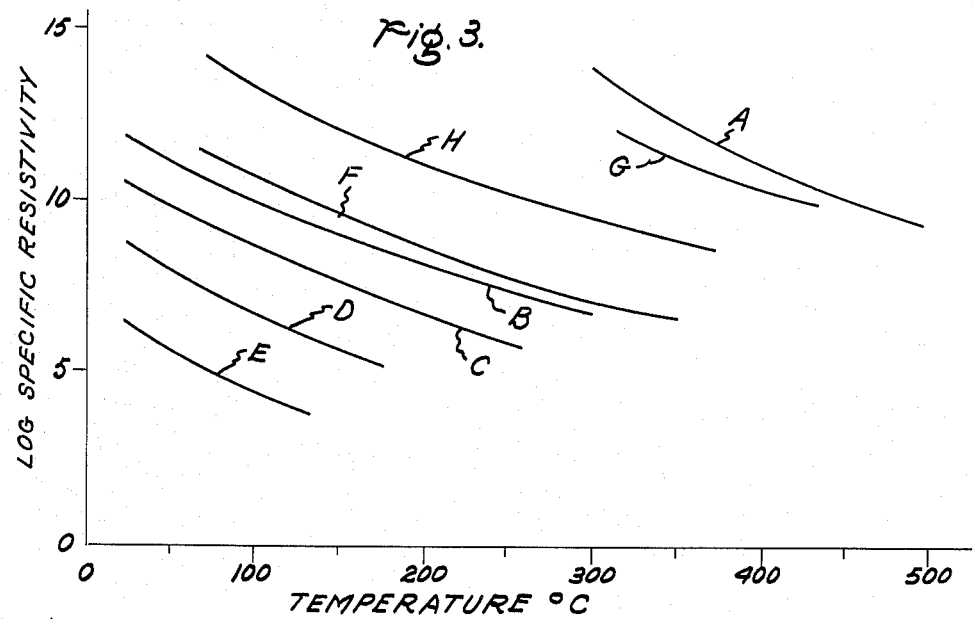
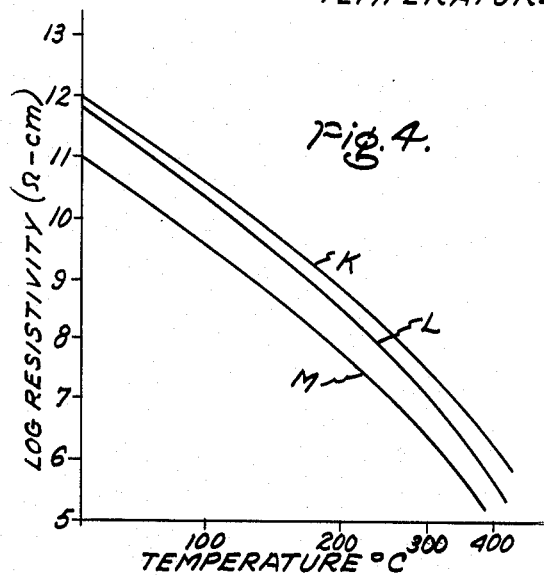
Inventors:
John D. Mackenzie,
Stephan P. Mitoff,
by ——
Their Attorney.

United States Patent Office 3,258,434
Patented June 28, 1966

3,258,434
SEMICONDUCTING GLASS
John D. Mackenzie, Schenectady, and Stephan P. Mitoff, Elnora, N.Y., assignors to General Electric Company, a corporation of New York
Filed Aug. 1, 1962, Ser. No. 213,960
6 Claims. (Cl. 252—519)

This is a continuation-in-part of our copending application Serial No. 131,185, filed August 14, 1961, and assigned to the assignee of the present case.

The present invention relates generally to the glass-making art and is more particularly concerned with a novel, substantially water-insoluble, electronically-conducting oxide glass and is further concerned with new and useful articles and devices made therefrom.

Glasses of various types have become widely used in the electronic industry. This has occurred, however, in the face of a substantial shortcoming of these materials, namely that the mechanism of conduction in them is ionic so that they change in composition or polarize under the influence of direct current. Accordingly, their service life is so short that certain important uses are barred to them, and in recognition of this, others skilled in the art have heretofore made determined efforts to produce glasses in which the conduction mechanism is electronic rather than ionic. These efforts have been intensified since it was generally recognized that an image orthicon tube having a target made of such a glass would have a much longer useful life and might perform just as well as one made in the conventional way of convential material.

For the first time to our knowledge, it is possible now, by virtue of this invention, to produce semiconducting oxide glasses in which the conducting mechanism is totally electronic rather than ionic, which have room-temperature electrical resistivity of $10^4$ to $10^{18}$ ohm-cm. Moreover, this invention has solved the problem of greatly prolonging the service life of image orthicon tubes and has opened up potentially important new uses for semiconducting glasses. These new glasses may, for example, be employed for field potential control in television picture tubes, being applied as semiconducting coatings on glass. They may also be practical for use as or in the production of thermistors, resistors, thermoelectrics, and elements to be subjected to different types of atmospheres or vacuum at temperatures up to 600° C.

This invention is based upon our discovery that the new polycomponent borate glasses disclosed and claimed in patent application Serial No. 128,447, filed August 1, 1961, in the name of J. D. Mackenzie and assigned to the assignee of the present case, can be treated in certain particular and critical manner to produce semiconducting glass bodies which are electronic conductors. It is further based upon our discoveries that the resistivity of these semiconducting glasses can be adjusted over a wide range of resistivity values and that production operations can readily be closely controlled to yield a material of precisely the desired resistivity value. This result, we have discovered, can be obtained by varying the total multivalent metal oxide content of these glass products and can alternatively be obtained by varying the ratio of valence states of the multivalent metal itself.

We have also found that these new glasses so far tested are apparently n-type semiconductors and that no matter how they are produced nor what their constituents are within the limitation set forth in detail below, the utility of these glasses is not materially impaired.

We have discovered further that these new glass products may be made by compounding calcium borate-type glass with at least 15 mole percent of multivalent (i.e., having more than one valence state) metal oxide or oxides. Additionally, we have found that this compounding or "doping" of the basic borate glass may satisfactorily be carried out either during the preparation of the basic glass or after it has been prepared.

Another of our discoveries is that the alkaline earth metal oxide component of these new glasses may be replaced in part or wholly by the multivalent metal oxide component without adversely affecting the important properties of the glass.

We have found that the new glass as prepared in accordance with the compositional and process requirements indicated above and subsequently to be described in detail are capable of being blown or drawn out or pressed or otherwise extended to produce membrane-like bodies suitable for use, for example, as image orthicon tube targets. Because of viscosity characteristics of glasses of this invention under relatively broad temperature ranges, bubbles may be blown in the course of producing thin glass films of the required dimensions for a variety of uses. Sections cut from large bubbles of this glass will normally be of thickness within a fairly broad and readily-controlled range related to the bubble size and will be of flatness adequate to a number of different purposes, but in any case may easily be flattened in a warm pressing operation. The homogeneity of these new glasses is readily established and, consequently, sections cut from large bubbles will consistently be substantially uniform throughout in electrical and physical characteristics.

Briefly described, a glass of this invention is a substantially water-insoluble, electronically-conducting glass having a room-temperature electrical resistivity of the order of $10^4$ to $10^{18}$ ohm-cm. In a preferred form, this glass, however, will have an electrical resistivity of $10^{10}$ to $10^{12}$ ohm-cm. and will contain from 20 to 40 mole percent af alkaline earth metal oxide and at least 15 mole percent of an oxide of a multivalent metal. In another preferred embodiment, the products of this invention will contain from 20 to 70 mole percent of the said oxide of a multivalent metal and only minor amounts or no alkaline earth metal oxide at all, with the maximum of 70 mole percent total for both alkaline earth metal oxides and multivalent metal oxides. Suitably, the multivalent metal oxide will be an oxide of a metal selected from the group consisting essentially of chromium, iron, antimony, vanadium, titanium, nickel, cobalt, magnanese, molybdenum and tungsten arsenic. Mixtures of two or more of these oxides are also contemplated.

In general, this glass is produced by mixing together finely-divided boric acid and an alkaline earth metal carbonate, and multivalent metal oxide or oxides, or just the boric acid and the multivalent metal oxide, heating the resulting substantially dry and homogeneous mixture containing at least 15 mole percent of the multivalent metal oxide and thereby reacting the boric acid with the carbonate and the multivalent metal oxide, and partially converting the multivalent metal to a different valence state to produce the "doped" glass of this invention, subsequently forming a bubble of said glass and finally shaping a portion of the glass bubble to predetermined form. As alternatives to the carbonate and acid, this method may involve the use of boric acid and the oxide, oxalate, nitrate or other suitable alkaline earth metal compound.

Those skilled in the art will gain a further and better understanding of the present invention from the detailed description set forth below taken in conjunction with the drawings accompanying and forming a part of this specification, in which:

FIG. 1 is a view in perspective of an image orthicon tube target of this invention;

FIG. 2 is a fragmentary, longitudinal, sectional view of an image orthicon tube equipped with the new target of FIG. 1; and FIG. 3 is a chart bearing curves illustrating electrical resistance data obtained in tests of four semi-conducting glasses of this invention.

As indicated above, the new materials of this invention are "doped" polycomponent glasses in that they contain a glass network modifier in addition to $B_2O_3$, and also contain one or more multivalent metal oxides. Furthermore, the network modifier may be an alkaline earth metal oxide, and as indicated above, this latter constituent must be present in an amount of from 20 to 40 mole percent of the glass body or mass. These glasses thus consist essentially of a network former in the form of $B_2O_3$ and a network modifier which may be calcium oxide, barium oxide, strontium oxide, magnesium oxide or a mixture of two or more of these oxides, and an oxide of a multivalent metal. Where magnesium oxide or calcium oxide is employed and it is necessary to production of a homogeneous body to overcome the immiscibility of MgO or CaO in $B_2O_3$, an additional component such as aluminum oxide or potassium oxide is also an essential constituent of the composition. The miscibility-promoting additive may be suitably employed in an amount ranging from about one mole percent to five mole percent of the ultimate glass composition and it may be incorporated in the raw mixture of oxides preparatory to the heating step. Alternatively, it may be added when the MgO and $B_2O_3$ or CaO and $B_2O_3$ are in the liquid state.

As described in the aforesaid copending case, the amount or proportion of the network modifier of these glass compositions is highly critical to the consistent production of glasses having the unique properties of this invention. If that constituent is present in an amount less than 20 mole percent, one or another or all of the special desirable properties of these glasses will be significantly impaired or even destroyed. On the other hand, if the network modifier aggregates more than 40 mole percent of the ultimate glass composition, one or more of these same properties will be again adversely affected to an important extent.

In compounding or doping this novel base glass to produce the new semiconducting glass of this invention, at least 15 mole percent of an oxide of a multivalent metal is necessary. This additive, like the miscibility-promoting agent, may be added at any stage during the preparation of the glass, or it may be introduced into the base glass after that product has been obtained. Further, as indicated above, this additive may suitably be made up of one or two or several oxides of multivalent metals, it being necessary only that the aggregate of such oxide or oxides be within the range from 15 mole percent to 80 mole percent. In addition, the amount of the said multivalent metal oxide stated above is calculated on the basis of the base glass product and therefore the "doped" semiconducting glass of this invention consists of not more than 80 mole percent of $CaO \cdot nB_2O_3$ or equivalent new borate glass.

Those skilled in the art will understand that the upper limit of the amount of the said multivalent metal oxide in these new semiconducting glasses is fixed principally by practical considerations. Thus, as much as 80 mole percent or four times more of this material may be used than the base glass, i.e., $CaO \cdot 2B_2O_3$ or an equivalent thereof. The important thing is that there is sufficient glass to provide an integral body of the requisite strength for the intended use. It is also important that the ratio of the glass to the multivalent oxide and the particle size and uniformity of the distribution of the said oxide throughout the glass body be such as to provide the desired electrical properties.

Bodies of these new glasses of various dimensions and shapes may be produced for a variety of uses. We have, for example, produced membrane-like glass bodies suitable for use as image orthicon tube targets and we have also succeeded in producing glass coatings, plates, sheets, and strips of thickness approaching one-half inch and suitable for a wide variety of purposes. The thickness limitation at the upper end of the range is set by practical considerations of production, while that at the lower end of the range is fixed by the use to be made of such materials. We have, however, been able to establish that over broad thickness and resistivity ranges these new glasses are uniformly superior in performance. Moreover, because of the ease of production of homogeneous bodies of uniform predetermined thickness and any desired size, and the ability to obtain precisely the desired resistivity characteristic, these new glasses may be preferred to previously-known materials for many commercial uses.

The following illustrative, but not limiting, examples of the practice of this invention method in the preparation of our new glasses are offered in the interest of further apprising those skilled in the art as to representative details and specific data:

*Example I*

Finely-divided boric acid of reagent grade is mixed together with 20 mole percent of barium carbonate and the resulting substantially dry and homogeneous mixture is then heated in an open platinum vessel. Finely-divided (minus 100 mesh—plus 200 mesh) vanadium pentoxide is stirred into this mixture during the heating stage, the $V_2O_5$ being added in an amount to establish 25 mole percent. The temperature of the mixture is thereby rapidly raised to 1250° C. and maintained at that level until a reaction resulting in the formation of $BaO \cdot 4B_2O_3$ is complete. Since the $V_2O_5$ does not react chemically with the BaO or the $B_2O_3$ under the conditions of this process, the glass product has the general composition:

$$0.75(BaO \cdot 4B_2O_3) + 0.25V_2O_5 \text{ or } 3(BaO \cdot 4B_2O_3) + V_2O_5$$

Actually, the $V_2O_5$ is to some extent reduced chemically under the conditions of this operation so that the vanadium exists in substantial proportions in two different valence states. Thus, in the presence of the platinum of the vessel at 1250° C. for the period required to complete the formation of $BaO \cdot 4B_2O_3$, about 10 percent of the vanadium is reduced to the quadrivalent state, i.e., $$\frac{V^{4+}}{V^{5+}} = 0.1 \text{ (approximately)}$$

This glass may be blown to produce a generally-ellipsoidal bubble having a major diameter approximating six inches. A portion of the cooled, crack-free bubble approximately two inches square then may suitably be selected for test.

*Example II*

A $CaO \cdot 2B_2O_3$ doped glass of this invention was produced by mixing together Baker reagent grade CaO, $V_2O_5$ and $Fe_3O_4$ with Pacific Coast borax pure $B_2O_3$ and then fusing the mixture in an open platinum crucible at 1250° C., as described above. The $V_2O_5$ and $Fe_3O_4$ were used in amounts of 30 mole percent and 15 mole percent, respectively, on the $CaO \cdot 2B_2O_3$ basis. In other words, the actual amounts of these several constituents of the glass product were:

| | Mole percent |
|---|---|
| $CaO \cdot 2B_2O_3$ | 55 |
| $V_2O_5$ | 30 |
| $Fe_3O_4$ | 15 |

As in Example I, this method of preparation results in the establishment of two different valence states of vanadium in about the Example I ratio.

This new product was annealed at 600° C. and then subjected to a number of tests in an effort to ascertain certain of its physical and electrical characteristics. In one of these tests, this glass was immersed in water at 30° C. to determine its solubility. The water was intermittently stored and after five days, the sample was removed and measured for weight loss which proved not to be detectable. After two months, under these conditions, the weight loss of this glass was less than 2 percent.

The electrical resistance data obtained for this product in the solid state are indicated by Curve B on the FIG. 3 chart. By way of comparison, Curve A of this chart represents data gathered in the same kind of test under the same conditions of $CaO \cdot 2B_2O_3$, that is, the base glass.

On applying a 100-volt direct current to a flat disk of this new glass two millimeters thick having a resistivity of $4 \times 10^5$ ohms at 230° C., resistivity remained unchanged after 72 hours. The same experiment performed on a sample of typical soda-lime silicate glass (Corning No. 0080) resulted in a hundred-fold increase from $5 \times 10^6$ ohms to $6 \times 10^8$ ohms after only 24 hours. Thus, the electronic nature of the conduction process in the present new glass is apparent.

By heating to 150° C. one end of a two-inch long rod of this new glass one-quarter inch in diameter, while the other end is maintained at room temperature, a thermal E.M.F. can be generated. The hot end of this rod is electrically positive relative to the cold end, which indicates that this glass is an n-type semi-conductor.

*Example III*

In still another similar operation, a base glass ($CaO \cdot 2B_2O_3$) doped with 50 mole percent of vanadium pentoxide was prepared by fusing a mixture of Baker reagent grade CaO and Pacific Coast borax pure $B_2O_3$ and Baker reagent grade $V_2O_5$ in an open platinum crucible at 1250° C. The $V_2O_5$ particles were substantially uniformly distributed through the resulting glass product, there being no difference to the naked eye between the various portions of the glass. No crystalline phase was detected both by X-ray diffraction and by microscopic examination. Thus, this product was uniformly opaque to visible light and of unvarying black appearance. Tests carried out on the solidified glass product, following annealing in dry $N_2$ and cutting into thin slices of about one mil thickness and roughly polishing, produced results approximating those obtained in the tests of the Example II glass product. The actual data obtained are represented by Curve C of FIG. 3. On applying a 100-volt direct current to a flat disk having a total resistance of $1 \times 10^6$ ohms at 200° C., resistance remains unchanged after 72 hours, thus illustrating the electronic nature of the conduction process. This material is therefore clearly suitable for the uses and purposes to which the Example II glass may be put.

*Example IV*

In an experiment the same as that described in Example II, except for the amounts of $V_2O_5$ and $Fe_3O_4$ employed, a glass was produced which on test provided the data for Curve D of FIG. 3. In this instance, 33 mole percent of $V_2O_5$ and 22 mole percent of $Fe_3O_4$ were used.

*Example V*

Another experiment having the purpose of demonstrating the utility of barium borate glass in accordance with the present invention was carried out after the manner described in Example II, BaO being substituted for CaO and being used in an amount approximating 35 mole percent on the basis of the $B_2O_3$ employed. Nickel oxide (NiO) was used in place of $V_2O_5$ and $Fe_3O_4$ and was employed in this case in the amount of 15 mole percent on the basis of the $BaO \cdot 2B_2O_3$ base glass. Again, the process resulted in the partial reduction of a portion of the NiO so that nickel of two different valence states was present in the ultimate glass product and accounted for the special semiconducting properties obtained.

*Example VI*

The applicability of this invention to magnesium borate glass may be demonstrated in an experiment based upon Examples II and V above, magnesium oxide (MgO) being employed in place of CaO or BaO and cobalt oxide (CoO) being used in place of $V_2O_5$ and $Fe_3O_4$ or NiO. In this case, the amount of CoO employed may suitably approximate 15 mole percent on the basis of the base glass ($MgO \cdot 2B_2O_3$). As in the prior case involving the use of NiO, a ratio between valence states of cobalt is established to provide the desired semiconducting properties.

*Example VII*

Following the procedure set forth in the foregoing examples of the practice of this invention, we prepared a novel glass product having the following composition:

| | Mole percent |
|---|---|
| $SrO \cdot 2B_2O_3$ | 55 |
| $V_2O_5$ | 45 |

The specific resistance of this product at room temperature was $4.6 \times 10^{11}$ ohm-cm. A disk of this glass suitably plated on two sides with platinum had, at room temperature, a resistance of $3.5 \times 10^{10}$ ohm, under 200-volt direct current. Its resistance was unchanged after six hours. A similar experiment on a typical soda-lime silicate glass made from a microscope slide gave a resistivity value of $2.3 \times 10^{10}$ ohms at room temperature and this resistivity increased tenfold to $23 \times 10^{11}$ ohms after only 24 minutes, thus again showing electronic conduction electrical characteristics similar to $CaO \cdot 2B_2O_3$ doped glass.

*Example VIII*

Another glass of this invention was prepared having the composition

| | Mole percent |
|---|---|
| $BaO \cdot 2B_2O_3$ | 52 |
| $V_2O_5$ | 48 |

The specific resistance of this product was $6.2 \times 10^{11}$ ohm-cm. at room temperature. Its electrical characteristics proved to be similar to those of $CaO \cdot 2B_2O_3$ doped glass and the other novel borate-doped glasses described above.

*Example IX*

Curve E represents data obtained in testing a new glass of this invention having the following composition:

| | Mole percent |
|---|---|
| $CaO \cdot 2B_2O_3$ | 40 |
| $V_2O_5$ | 50 |
| $Fe_3O_4$ | 10 |

The electrical properties of this glass were closely similar to those of the other new glasses described above.

*Example X*

In still another experiment following the procedure of Example II, we added to the initial dry powder mixture an amount of Baker reagent grade $Al_2O_3$ for the purpose of substantially improving the workability of the ultimate glass product. Thus, the actual amounts of the several constituents of this mixture were:

| | Mole percent |
|---|---|
| $CaO \cdot 2B_2O_3$ | 53 |
| $V_2O_5$ | 28 |
| $Fe_3O_4$ | 13 |
| $Al_2O_3$ | 6 |

The glass product obtained was subjected to the tests described in Example II with the same results being obtained for this product as for the Example II glass.

*Example XI*

In an operation like that of Example III, a base glass ($CaO \cdot 2B_2O_3$) doped with 6.25 mole percent $Fe_3O_4$ on the basis of the $CaO \cdot 2B_2O_3$ content was prepared by fusing a mixture of Baker reagent grade CaO and Pacific Coast borax pure $B_2O_3$ and Baker reagent grade $Fe_3O_4$ in an open platinum crucible at 1250° C. The $Fe_3O_4$ particles were substantially uniformly distributed through the resulting glass and the ratio of $Fe^{2+}$ to $Fe^{3+}$ was controlled and adjusted by bubbling a mixture consisting of about equal parts of hydrogen and nitrogen through the glass melt. The changes in electrical resistivity of the glass with differences in the periods of exposure of the glass to such gas mixture contact are indicated in FIG. 4, wherein log resistivity (in ohm-cm.) is plotted against temperature in degrees centigrade for three different $Fe^{2+}$ to $Fe^{3+}$ ratios in this glass. Thus, Curve K represents a ratio of $$0.135 \frac{Fe^{2+}}{Fe^{3+}}$$

while Curves L and M represent $$\frac{Fe^{2+}}{Fe^{3+}}$$

ratios of 0.202 and 0.234, respectively.

*Example XII*

In substantially the same operation as described in Example I, a two-component semiconducting glass was prepared from boric acid and manganese oxide. Finely-divided boric acid of reagent grade was mixed with about an equal amount of Baker reagent grade MnO, the proportions actually being 53 mole percent MnO and 47 mole percent $B_2O_3$. The mixture was heated to 1250° C. in an open platinum crucible in an air atmosphere and maintained at that temperature until a reaction resulting in the formation of $MnO \cdot B_2O_3$ glass was complete. As shown by Curve F of FIG. 3, this glass proved on test to have a room temperature resistivity of $10^{12}$ ohm-cm. and had at 270° C. over a period of three days a resistivity which remained constant at $10^8$ ohm-cm.

*Example XIII*

In a repetition of the Example XII, a bismuth oxide-borate glass was prepared using Baker reagent grade $Bi_2O_3$ and finely-divided boric acid, as before. Again, this mixture of equal parts (50 mole percent $Bi_2O_3$) was heated to 1250° C. in air in an open platinum crucible and maintained at that temperature until the resulting glass-producing reaction was completed. This glass product had the same resistivity values on test as reported for the $MnO \cdot B_2O_3$ glass of Example XII.

*Example XIV*

In still another operation like that of Example XII, a titania-doped barium borate glass having semiconducting properties was made. This glass had the following composition:

| | Mole percent |
|---|---|
| BaO | 22 |
| $B_2O_3$ | 44 |
| $TiO_2$ | 34 |

As originally obtained, this glass was yellow due to the fact that little $Ti^{3+}$ was present, and for the same reason its resistivity value was quite high. By subjecting it to reducing conditions, i.e., a hydrogen atmosphere, at a temperature of 550° C. for 16 hours, the glass became blue in color because of partial reduction of its $Ti^{4+}$ content and its resistivity value changed markedly, as Curves G and H of FIG. 3 illustrate. Thus, the original glass (yellow) is represented by Curve G, while Curve H represents test values of resistivity obtained for the treated (blue) glass product.

As indicated above and illustrated in the foregoing examples, the conductivity of the glasses of this invention can be varied and adjusted to predetermined values and this may be done without altering the total amount or concentration of the multivalent metal oxide in the glass. Thus, it is a matter of regulating the ratio or proportion of the lower and higher valence ions, e.g. $Fe^{2+}/Fe^{3+}$, $Ti^{3+}/Ti^{4+}$, and $V^{4+}/V^{5+}$. As those skilled in the art will understand, this result can be obtained through oxidizing or reducing action by means of reagents in solid or gaseous or even in liquid form. As examples of reducing agents or catalysts specially suitable for this purpose, there are carbon black, platinum (the crucible metal in foregoing examples), titanium metal, and metallic iron. Air or oxygen and hydrogen represent gaseous or atmospheric reagents of this type.

The change of valence state of a part of the multivalent metal component of these glasses may be accomplished during the preparation or formation of the glass or after it has been formed. Further, this change may be to increase the proportion of higher valence state multivalent metal ions or to increase the proportion of the lower valence ones. Generally, however, a ratio of 9 to 1 either way represents the outer limit of these proportions of the present glasses for useful semiconducting properties and a large change is therefore not essential. In some cases, the preferred ratio will be from 4 to 1 to equal amounts of the higher and lower valence ions. In cases of more than two valence state ions, the intermediate states may be considered as either the highest or the lowest for purposes of fixing the ratio within the foregoing limits.

With reference to FIGS. 1 and 2 of the drawings wherein an important use of the products of this invention produced in accordance with the foregoing examples are illustrated, 10 is disk-like target for use in an image orthicon tube 11. Target 10 is approximately 50 mm. in diameter and about five microns thick. Thus, it is membrane-like and requires supporting means to secure it and maintaining it in position in tube 11. The disk may be formed in any convenient manner, for example, by blowing a bubble of the freshly-prepared, doped glass and selecting and separating a small portion of the bubble after the glass has solidified, and reheating and prefiring that portion to final thickness and cutting or trimming it to disk form and size. The supporting means comprises metal ring 12 sealed to disk 10 around the periphery thereof, as shown in FIG. 1, ring 12 being of metal such as iron having a thermal expansion coefficient approximating that of the disk. Ring 12 is bonded to disk 10 by any suitable method.

A photo cathode 13 is disposed within the tube 11 and secured to the front face portion thereof suitably in the manner presently employed in the commercial production of image orthicon tubes. Electron gun 14 is situated behind target 10 at the opposite end of the tube in position to direct electrons against the target as a scanning beam which is modulated, as those skilled in the art will understand, by the charges conducted perpendicularly through the membrane-like target disk for neutralization by the scanning beam. A grid 15 is provided adjacent to gun 14 and a multiplier 16 operatively associated therewith serves to collect secondary electrons from grid 15 for amplification for broadcasting of the photo image "seen" by the tube of FIG. 11.

Substances such as silica and alkali metal oxides may be present in readily detectable amounts in these new glasses without impairing their properties materially. Preferably, however, the amount of such "inert" impurities will not exceed an aggregate five mole percent of the borate base glass (i.e., minus the "doping" additive) composition. Further, those skilled in the art will understand that the glasses of this invention are not in any sense borosilicate glasses and are not similar to those glasses in either composition or properties, the silica content of the present products making no contribution whatever to their unique and valuable characteristics.

As used herein and in the appended claims, the term "substantially water-insoluble" means and connotes, as indicated above, a relative rather than an absolute resistance to the dissolving action of water. The comparison is with the borate glasses of the prior art. While that material has a strong affinity for water, the present glasses do not tarnish on exposure to the atmosphere at room temperature over a period of six months, and as previously stated, dissolve or erode only to the extent of less than two percent over two months in turbulent water at 30° C. For all the uses contemplated, this is in fact a negligible rate.

It will be understood that throughout this specification and in the appended claims, whatever amounts, proportions, ratios or percentages are stated, reference is made to the mole basis rather than to weight basis or to the volume basis.

Semiconducting glasses of silicate, phosphate and germanate composition but having electrical properties similar to those of this invention are disclosed and claimed in application Serial No. 219,044, filed August 23, 1962, in the name of J. D. Mackenzie and assigned to the assignee of the present case.

Having thus described this invention in such full, clear, concise and exact terms as to enable any person skilled in the art to which it appertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, part of the specifically-described embodiments of the invention may be made without departing from the scope of the invention as set forth in what is claimed.

What we claim as new and desire to secure by Letters Patent of the United States is:

1. A borate glass consisting essentially of boron oxide and between 20 and 40 mole percent of a glass network modifier selected from the group consisting of calcium oxide, barium oxide, magnesium oxide and strontium oxide, and at least 15 mole percent of an oxide of a multivalent metal selected from the group consisting of chromium, iron, antimony, vanadium, titanium, nickel, cobalt, manganese, molybdenum, tungsten and arsenic and mixtures thereof, said borate glass having a room-temperature electrical resistivity of from $10^4$ to $10^{12}$ ohm-cm. and said oxide of a multivalent metal providing in the glass metal ions of higher valence state and metal ions of lower valence state in the ratio to each other of from equal parts to four parts to one part.

2. A substantially water-insoluble electronically-conducting iron oxide borate glass in which iron ions exist in two different valence states in the proportion of from equal parts to four parts to one part, said glass consisting essentially of $CaO \cdot 2B_2O_3$ and from 15 to 80 mole percent of iron oxide and having a room-temperature electrical resistivity of from $10^4$ to $10^{18}$ ohm-cm.

3. A substantially water-insoluble electronically-conducting nickel oxide borate glass in which nickel ions exist in two different valence states in the proportion of from equal parts to four parts to one part, said glass consisting essentially of $BaO \cdot 2B_2O_3$ and from 15 to 80 mole percent of nickel oxide and having a room-temperature electrical resistivity of from $10^4$ to $10^{18}$ ohm-cm.

4. A substantially water-insoluble electronically-conducting calcium borate glass containing in substantially uniform distribution vanadium pentoxide and magnetite, said glass having an electrical resistance of about $10^{12}$ ohm-cm. at room temperature and of about $10^7$ ohm-cm. at 300° C. and having the nominal composition

|  | Mole percent |
|---|---|
| $CaO \cdot 2B_2O_3$ | 55 |
| $V_2O_5$ | 30 |
| $Fe_3O_4$ | 15 |

5. A substantially water-insoluble electronically-conducting calcium borate glass containing in substantially uniform distribution vanadium pentoxide and magnetite, said glass having an electrical resistance of about $10^6$ ohm-cm. at room temperature and of about $10^4$ ohm-cm. at 150° C. and having the nominal composition

|  | Mole percent |
|---|---|
| $CaO \cdot 2B_2O_3$ | 40 |
| $V_2O_5$ | 50 |
| $Fe_3O_4$ | 10 |

6. A semiconducting, substantially water-insoluble calcium borate glass having at room temperature an electrical resistance of about $10^{12}$ ohm-cm. and having at 300° C. an electrical resistance of about $10^7$ ohm-cm., said glass consisting essentially of CaO, $B_2O_3$, $V_2O_5$, $Fe_3O_4$ and $Al_2O_3$ in the following proportions:

|  | Mole percent |
|---|---|
| $CaO \cdot 2B_2O_3$ | 53 |
| $V_2O_5$ | 28 |
| $Fe_3O_4$ | 13 |
| $Al_2O_3$ | 6 |

References Cited by the Examiner

UNITED STATES PATENTS

| 2,506,741 | 5/1950 | Rose | 313—65 X |
| 2,518,434 | 8/1950 | Lubszynski | 313—65 X |
| 2,786,819 | 3/1957 | Smith et al. | 252—519 |
| 2,862,891 | 12/1958 | Jonker et al. | 252—519 |
| 2,962,452 | 11/1960 | Counts et al. | 252—520 |
| 3,061,752 | 10/1962 | Banks | 106—47 X |
| 3,093,598 | 6/1963 | McMillan et al. | 252—521 |

OTHER REFERENCES

Verwey et al.: Controlled-Valency Semiconductors, Philips Research Rep. 5, pp. 173–187 (1950).

Levin et al.: Phase Diagrams for Ceramists, p. 57, (1956).

Baynton et al.: Semiconducting Properties of Some Vanadate Glasses, J. of the Electrochemical Soc., April 1957, pp. 237–239.

ALBERT T. MEYERS, *Primary Examiner.*

J. D. WELSH, *Assistant Examiner.*

JULIUS GREENWALD, *Examiner.*